(12) United States Patent
Fürst et al.

(10) Patent No.: US 8,940,369 B2
(45) Date of Patent: Jan. 27, 2015

(54) PROCESS FOR PRODUCING A POLYMERIC FILM WITH A CURED POLYSILOXANE COATING

(71) Applicant: Huhtamaki Films Germany GmbH & Co. KG, Forchheim (DE)

(72) Inventors: Michael Fürst, Heiligenstadt (DE); Herbert Pfeffermann, Forchheim (DE)

(73) Assignee: Huhtamaki Films GErmany GmbH & Co. KG, Forchheim (DE)

( * ) Notice: Subject to any disclaimer, the term of this patent is extended or adjusted under 35 U.S.C. 154(b) by 0 days.

(21) Appl. No.: 13/780,344

(22) Filed: Feb. 28, 2013

(65) Prior Publication Data

US 2013/0189436 A1 Jul. 25, 2013

Related U.S. Application Data

(63) Continuation of application No. PCT/EP2011/004377, filed on Aug. 31, 2011.

(30) Foreign Application Priority Data

Aug. 31, 2010 (DE) .......... 10 2010 036 022

(51) Int. Cl.
*B05D 3/02* (2006.01)
*B32B 3/30* (2006.01)
(Continued)

(52) U.S. Cl.
CPC ........... *B05D 3/0254* (2013.01); *C08J 2300/22* (2013.01); *B32B 2250/40* (2013.01); *C09J 2477/006* (2013.01); *B32B 2307/748* (2013.01); *C09J 2423/046* (2013.01); *B32B 3/30* (2013.01); *B32B 27/08* (2013.01); *C09J 7/0228* (2013.01); *B32B 2250/03* (2013.01); *B32B 2255/24* (2013.01); *C08J 7/047* (2013.01); *B32B 27/34* (2013.01); *C09J 2483/005* (2013.01); *B32B 2255/10* (2013.01); *C08J 2300/16* (2013.01); *B32B 2250/24* (2013.01); *B32B 2405/00* (2013.01); *C08J 2483/04* (2013.01);
(Continued)

(58) Field of Classification Search
USPC .................................... 427/299, 256; 428/352
See application file for complete search history.

(56) References Cited

U.S. PATENT DOCUMENTS 5,672,428 A * 9/1997 Muschelweicz et al. ...... 428/352
6,737,119 B1 * 5/2004 Kim et al. ...................... 427/387
(Continued)

FOREIGN PATENT DOCUMENTS

DE 28 01 038 A1 7/1979
EP 0 071 349 A2 2/1983
(Continued)

OTHER PUBLICATIONS

International Search Report Dated Feb. 2, 2012, Mailed Feb. 15, 2012.
(Continued)

*Primary Examiner* — Nathan T Leong
(74) *Attorney, Agent, or Firm* — Norris McLaughlin & Marcus PA

(57) ABSTRACT

Process for producing a polymeric film which is furnished on one side with a cured polysiloxane coating and has an overall thickness of ≤45 μm by furnishing both sides of a collapsed tubular film with a cured polysiloxane coating.

17 Claims, 3 Drawing Sheets

(51) Int. Cl.
    *B32B 27/08* (2006.01)
    *C09J 7/02* (2006.01)
    *C08J 7/04* (2006.01)
    *B32B 27/34* (2006.01)
    *B32B 27/32* (2006.01)

(52) U.S. Cl.
    CPC ........... *C09J2423/106* (2013.01); *B32B 27/32* (2013.01); *C08J 2323/06* (2013.01); *B32B 2255/26* (2013.01)
    USPC .................... 427/299; 427/256; 428/352

(56) References Cited

U.S. PATENT DOCUMENTS

2009/0081430 A1* 3/2009 Husemann et al. ........... 428/212
2009/0134547 A1* 5/2009 Bauer et al. .............. 264/211.12

FOREIGN PATENT DOCUMENTS

| | | |
|---|---|---|
| EP | 0 769 540 A2 | 4/1997 |
| EP | 1 277 802 A1 | 1/2003 |
| EP | 1 557 451 A1 | 7/2005 |
| EP | 1 734 093 A1 | 12/2006 |
| JP | 2001 225416 A1 | 8/2001 |
| JP | 2009 233953 A1 | 10/2009 |
| WO | 2007/141327 A | 12/2007 |

OTHER PUBLICATIONS

Translation of International Search Report Dated Feb. 2, 2012, Mailed Feb. 15, 2012.

* cited by examiner

PROCESS FOR PRODUCING A POLYMERIC FILM WITH A CURED POLYSILOXANE COATING

This application is a Continuation of PCT/EP2011/004377, filed Aug. 31, 2011, which claims foreign priority benefit under 35 U.S.C. §119 of German Patent Application 10 2010 036 022.8 filed Aug. 31, 2010, the contents of all of which are incorporated herein by reference.

The present invention relates to a process for producing a plastics foil provided with a cured polysiloxane coating on one surface, whereby a tubular, flat laid plastics foil is equipped on both surfaces with a cured polysiloxane coating, comprising steps (a) to (d) listed hereinafter, and then—if the foil has not already previously been opened at least at one side—completely opening it at least at one side along a lateral edge, a plastics foil obtainable by said process and equipped with a cured polysiloxane coating, and the use of such plastics foil as a release foil or protection foil.

BACKGROUND OF THE INVENTION

Peelable release foils are widely used as removable protection foils for adhesive tapes, self-adhesive labels, or adhesive sanitary and hygiene products, in order to prevent adhesion of these single- or double-side-adhesive products during storage or processing. They have to feature good release effect with respect to adhesives such as pressure-sensitive adhesives or other adhesive materials.

Siliconized release foils are already known from the prior art, for example from EP 1 277 802 A1 or EP 0 769 540 A2.

Siliconized release foils are usually produced by providing single- or multilayer foils with a polysiloxane coating. These foils are first coated with a polysiloxane that has not yet been hardened, and once the coating process has taken place the polysiloxane is then preferably thermally hardened.

However, a disadvantage of a process of this type is that the plastics foils requiring coating have to meet certain minimum mechanical and/or thermomechanical requirements, in order that they withstand the thermal stresses during the curing procedure for the polysiloxane coating. Accordingly, the plastics foils have to have a certain minimum thickness, dependent on the polymer material from which they have been produced, in order that the coating procedure and in particular the curing procedure do not cause any thermal or thermomechanical overloading of the foil to be coated or of the coated foil, with consequent undesired adverse effects on quality or on processes, like for example formation of folds, web shrinkage, web break-offs, or defects in the polysiloxane coating.

However, costs are not the only reason for the provision of a comparatively low thickness of a siliconized release foil for many applications.

There is therefore a need to provide processes which can provide single- or multilayer plastics foils with a curable polysiloxane coating which do not show the above-mentioned disadvantages.

It was therefore an object of the present invention to provide a process for producing a single- or multilayer plastics foil provided with a thermally cured polysiloxane coating on one side, by neither having to use a foil meeting certain minimum mechanical requirements, in particular a certain minimum thickness for the application of the polysiloxane coating, nor having to postpone the reduction of the single- or multilayer plastics foil to a desired thickness until after the application of the polysiloxane coating.

SUMMARY OF THE INVENTION

This object is achieved through a preferably continuous process for producing a single- or multilayer plastics foil provided with a thermally hardened polysiloxane coating on one side, in that a preferably tubular, flat laid, optionally already opened and optionally evacuated single- or multilayer plastics foil first (a) is single-side coated on one of its surfaces, optionally under evacuation, with at least one polysiloxane that still has to be cured,
(b) this polysiloxane coating is cured under drying,
(c) the other uncoated second surface of the flat laid, preferably tubular plastics foil is coated, optionally under evacuation, with at least one polysiloxane that still has to be cured,
(d) this polysiloxane coating is cured under drying,
(e) in the movement direction, and at least along one lateral edge, preferably along both lateral edges, the flat laid, optionally still tubular plastics foil coated on each surface with a cured polysiloxane coating is completely opened or preferably separated and the full-width flat foil provided with a cured polysiloxane coating on one surface, or each of the resultant two foils provided on one surface with a polysiloxane coating is/are stored in the form of a roll.

The process of the invention can preferably be carried out continuously. It is moreover also possible that step (e), to the extent that it concerns only the opening or preferably separation, is carried out on the extruded, flat laid, tubular plastics foil before step a).

The process of the invention can provide a single- or multilayer foil made of plastic provided with a cured polysiloxane coating on one of its surfaces, whereby the thickness of the foil can already during siliconization be up to 50% lower than that of a foil which is siliconized by means of conventional coating processes. This is rendered possible by the use of a flat laid, optionally already opened, tubular foil during coating in steps (a) and (c) and during each thermal curing procedure in steps (b) and (d), since during said operations the foil has practically twice the thickness, and therefore has the necessary mechanical and/or thermomechanical robustness. However, a corresponding foil which is half as thick, because the thickness of which corresponds only to the thickness of an inventively used foil, but not to that of the flat laid, tubular foil, lacks the mechanical and/or thermomechanical robustness required therefore. The process of the invention has the advantage that there is no need to reduce the thickness of an already siliconized plastics foil, for example by orientation.

By starting from a preferably tubular plastics foil provided with a cured polysiloxane coating on both surfaces according to the inventive process, a single-side-siliconized foil is obtained by complete opening of the flat laid, tubular plastics foil at least along one lateral edge in the movement direction, and a spreading to full width, which siliconized foil can have a thickness up to 50% lower than that of a foil which has been siliconized successfully by means of conventional coating processes. According to the invention, this complete opening of the flat laid, preferably tubular plastics foil can already take place before the first polysiloxane coating process, i.e. before step a).

DETAILED DESCRIPTION

Figure 1:
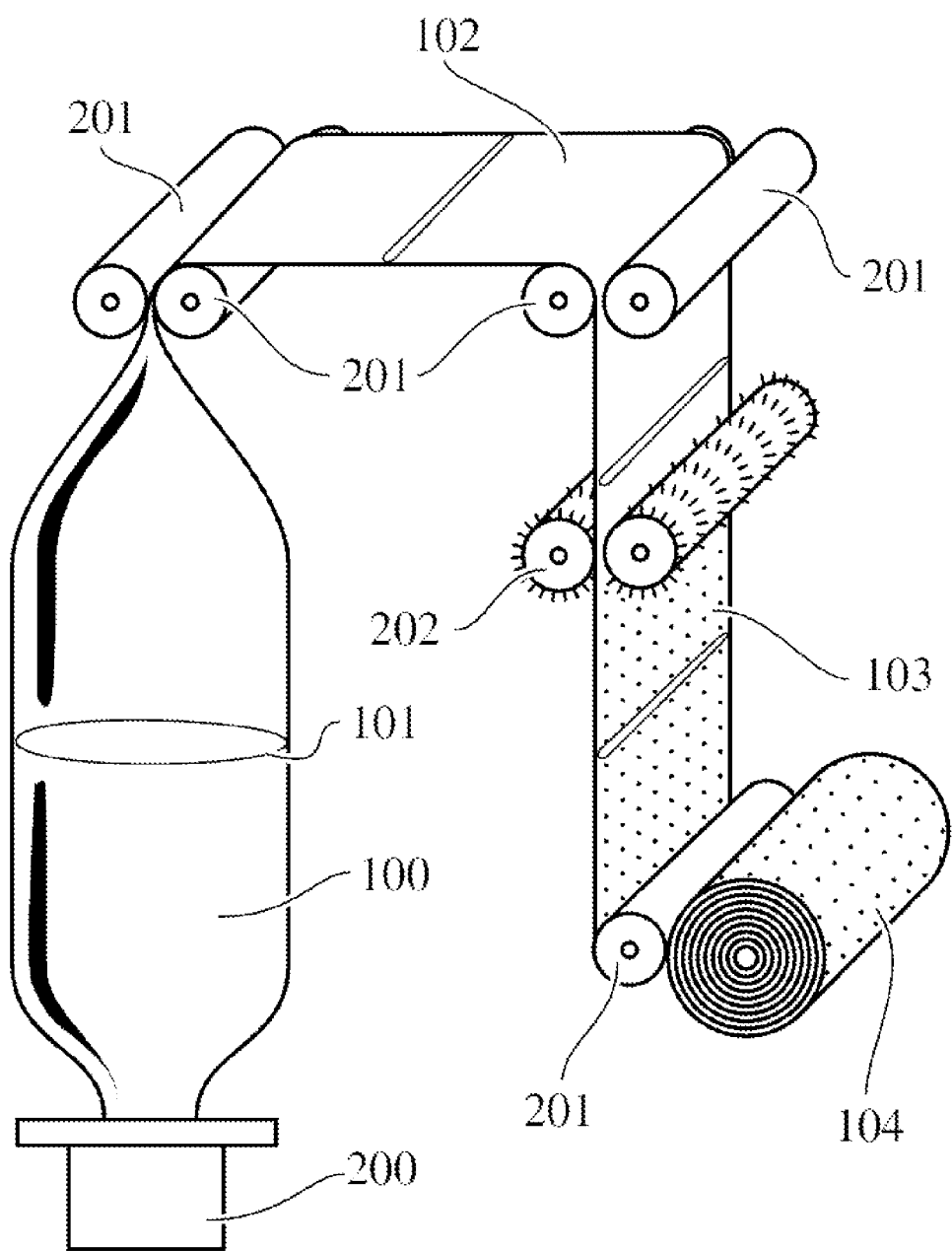
FIG. 1 is a diagram of the preferred production process for a flat laid, tubular foil used in an inventive process.

In steps (a) and (c) of the inventive process, in each case one of the surfaces of the flat laid, preferably tubular foil is coated with at least one uncured, flat laid polysiloxane. It is preferable that in each case the flat laid foil is evacuated, in order to avoid unevenness of the flat laid foil during coating, for example caused by air cushions present in the flat laid foil, and in order to avoid the occurrence of defects in the polysiloxane coating. In each case here, one of the surfaces of the single- or multilayer, flat laid, preferably still tubular foil is provided with at least one preferably liquid, particularly preferably high-viscous, uncured polysiloxane or with a preferably liquid mixture of at least one uncured polysiloxane and optionally of at least one of the additives mentioned hereinafter. The coating is carried out by a full-surface-area coating in each case of the one of the surfaces of the single- or multilayer, flat laid, preferably still tubular foil with at least one polysiloxane or a with a mixture.

In steps (b) and (d) of the inventive process, the polysiloxane coating applied in steps (a) and (c), in each case to one of the surfaces of the flat laid, preferably still tubular foil is in each case cured under drying, preferably through exposure to heat and optionally with UV irradiation. The preferably still tubular foil thus provided with a cured polysiloxane coating on both surfaces can optionally then be cut to the desired dimensions and separated at one or both sides, and preferably stored in the form of a roll.

It is preferable that, before step (c), the flat laid, preferably still tubular foil already provided with a cured polysiloxane coating on one surface is turned about 180°, preferably with the aid of a crossbar system, and then that step (c) is carried out. It is also possible that the flat laid, preferably still tubular foil provided with a cured polysiloxane coating on one surface is placed into intermediate storage in rolled-up form before step (c).

In a preferred embodiment of the inventive process, after step (d), the flat laid, preferably still tubular foil provided with a cured polysiloxane coating on each surface is, in a further step (e), in the movement direction at least along one lateral edge, preferably along both lateral edges, completely opened, or preferably separated, and the resultant full-width flat foil or the resultant two foils is/are then preferably stored in the form of a roll.

The tubular plastics foil used in the process of the invention is preferably a foil which, before the provision of a cured polysiloxane coating, is a single- or multilayer, preferably single-layer tubular foil.

In a preferred embodiment of the inventive process, the plastics foil or at least one layer of the preferably tubular plastics foil, before the provision of the cured polysiloxane coating, is based on at least one optionally biodegradable, thermoplastic polymer, preferably on at least one olefin homo- or copolymer, on at least one thermoplastic homo- or copolyamide, and/or on at least one thermoplastic, biodegradable polymer.

A material preferably suitable for producing said layer is at least one thermoplastic olefin homo- or copolymer of $\alpha,\beta$-unsaturated olefins having from 2 to 10 carbon atoms. Suitable olefin homopolymers are preferably those selected from the group consisting of ethylene homopolymers (polyethylenes, PE), preferably LDPE and HDPE, propylene homopolymers (polypropylenes, PP), butylene homopolymers (polybutylenes, PB), and isobutylene homopolymers (polyisobutylenes, PI), or a mixture made of at least two of the polymers mentioned. "LDPE" indicates low-density polyethylene with density in the range from 0.86 to 0.93 g/cm$^3$, featuring a high degree of branching of the molecules. "HDPE" indicates high-density polyethylene with only little branching of the molecular chain, where density can be in the range from 0.94 to 0.97 g/cm$^3$. Suitable olefin copolymers are preferably copolymers of ethylene and/or propylene and of at least one $\alpha$-olefin having at least 4, preferably from 4 to 10, particularly preferably from 4 to 8, carbon atoms, and very particularly preferably copolymers of ethylene and/or propylene with at least one $\alpha$-olefin selected from the group consisting of butene, hexene, and octene. The proportion of $\alpha$-olefin in the olefin copolymer is preferably at most 25% by weight, particularly preferably at most 15% by weight, based in each case on the total weight of the olefin copolymer. Particularly suitable copolymers of ethylene and of at least one $\alpha$-olefin having at least 4 carbon atoms are LLDPE and/or mPE. "LLDPE" indicates linear low-density ethylene copolymers which are characterized by the presence of a linear main chain with side chains located thereon, and by density in the range of 0.86 and 0.94 g/cm$^3$. "mPE" indicates ethylene copolymers which have been polymerized by means of metallocene catalysts and which preferably have a density in the range of 0.88 and 0.93 g/cm$^3$. Preferred olefin homo- or copolymers for producing the layer (1) are ethylene homo- or copolymers and/or propylene homo- or copolymers. Particular preference is given to an ethylene homopolymer, such as LDPE or HDPE for producing the layer (1).

In a preferred embodiment of the inventive process, the preferably tubular foil is, before the provision of the cured polysiloxane coating, composed only of one layer, which is based on at least one olefin homo- or copolymer, preferably on an olefin homopolymer, particularly preferably on HDPE, on LDPE or on polypropylene.

Another material suitable for producing the, or a, layer of the preferably tubular plastics foil is at least one thermoplastic homo- and/or copolyamide. The layer can preferably be produced by using thermoplastic homo- or copolyamides selected from the group consisting of thermoplastic aliphatic, semiaromatic, or aromatic homo- or copolyamides. These homo- or copolyamides can be produced from diamines, such as aliphatic diamines having from 2 to 10 carbon atoms, in particular hexamethylenediamine and/or aromatic diamines having from 6 to 10 carbon atoms, in particular p-phenylenediamine, and from dicarboxylic acids such as aliphatic or aromatic dicarboxylic acids having from 6 to 14 carbon atoms, e.g. adipic acid, terephthalic acid, or isoterephthalic acid. It is moreover possible to produce homo- or copolyamides from lactams having from 4 to 10 carbon atoms, for example from $\epsilon$-caprolactam. Polyamides used in the invention are preferably PA 6, PA 12, PA 66, PA 6I, PA 6T, or corresponding copolymers, or mixtures of at least two of the polyamides mentioned.

In another preferred embodiment of the inventive process, it is also possible to use a multilayer plastics foil as preferably tubular foil before the provision of the cured polysiloxane coating. This foil can have an internal layer based on at least one homo- or copolyamide with, on each surface, a layer based on at least one olefin homo- or copolymer, preferably on at least one olefin homopolymer, particularly preferably on at least one propylene homopolymer, and, if necessary, adhesion-promoter layers.

It is also possible to use at least one thermoplastic biodegradable polymer for producing the, or a, layer of the plastics film used in the invention.

According to the present invention, the expression "biodegradable polymer" means a natural, semisynthetic, or synthetic polymer in various forms, e.g. in the form of a, or the single, layer of a tubular foil which, with exposure to microorganisms and/or to enzymes, can be decomposed to give water, carbon dioxide, and biomass in accordance with DIN EN 13432, and which according to the disintegration test is biodegraded to an extent of at least 90%, preferably of at least 95%, particularly preferably of ≥99%, after 12 weeks of aerobic composting.

Preferably for producing the preferably tubular plastics foil at least one thermoplastic biodegradable polymer selected from the group comprising lactic acid homo- and copolymers, preferably polylactides, particularly preferably DL-lactide, L-lactide, and D-lactide, polyhydroxyalkanoates, cellulose, cellulose derivatives, thermoplastic starch, polyesters, preferably polyesters derived from lactones having from 4 to 10 carbon atoms, particularly preferably polycaprolactones, at least partially hydrolyzed polyvinyl acetates, ethylene-vinyl alcohol copolymers, copolymers of at least two monomers of the polymers mentioned, and mixtures of at least two of the polymers can be used. At least partially hydrolyzed polyvinyl acetates can be obtained by complete or incomplete hydrolysis of corresponding polyvinyl acetates (PVAc), and comprise not only partially hydrolyzed polyvinyl acetates with a degree of hydrolysis of from 50 to 98 mol % but also fully hydrolyzed polyvinyl acetates, i.e. polyvinyl alcohols (PVOH) with a degree of hydrolysis ≥98%. Ethylene-vinyl alcohol copolymers (EVOH) can be obtained through hydrolysis of corresponding ethylene-vinyl acetate copolymers (EVAc), and preferably comprise ethylene-vinyl alcohol copolymers (EVOH) with a degree of hydrolysis ≥98% and a proportion of ethylene of from 0.01 to 20 mol %, preferably from 0.1 to 10 mol %.

In another preferred embodiment of the inventive process, a single-layer plastics foil, preferably a tubular foil, is used before the application of the curable polysiloxane coating, which foil is based on at least one biodegradable polymer, preferably on at least one polylactide.

According to the inventive process, the flat laid, single- or multilayer, preferably still tubular or optionally already opened plastics foil is provided with a cured polysiloxane coating on both surfaces.

For the purposes of the present invention, the expression "polysiloxane" means compounds having polymer chains composed of silicon atoms and oxygen atoms in alternation. A polysiloxane is based on n repeating siloxane units (—[Si(R$_2$)—O]—)$_n$ which in each case mutually independently have disubstitution with two organic moieties R, where R is in each case preferably R$^1$ or OR$^1$, and each R$^1$ is an alkyl moiety or an aryl moiety. It is preferable that the hardened polysiloxane coating is based on a repeating dialkylsiloxane unit or on a repeating alkylaryl siloxane unit. These units can be classified as a function of the number of Si—O bonds in an individual siloxane unit, based in each case on a tetravalent silicon atom, as terminal monofunctional siloxanes (M) having one Si—O bond, difunctional siloxanes (D) having two Si—O bonds, trifunctional siloxanes (T) having three Si—O bonds, and tetrafunctional siloxanes (Q) having four Si—O bonds. it is preferable that the polysiloxane coating of the invention has a crosslinked ring- or chain-type structure, particularly a crosslinked chain-type structure, linked via (D), (T), and/or (Q) units to give a two- or three-dimensional network. The number n of repeating siloxane units [Si(R$_2$)—O]—)$_n$ in the polysiloxane chain is called the degree of polymerization of the polysiloxane.

According to the inventive process the cured polysiloxane coating is preferably based on at least one cured, i.e. crosslinked polysiloxane selected from the group consisting of addition-crosslinked, preferably metal-catalyzed addition-crosslinked, condensation-crosslinked, free-radical-crosslinked, and/or cationically crosslinked polysiloxanes.

A particularly preferred polysiloxane coating is based on at least one cured polysiloxane which has been cured thermally, optionally by exposure to UV radiation. Preferably, the polysiloxane coating is based on at least one cured polysiloxane selected from the group comprising polydialkylsiloxanes, preferably polydimethylsiloxanes, and polyalkylarylsiloxanes, preferably polymethylphenylsiloxanes, in each case cured. Thermally cured polysiloxanes can be obtained through thermal hydrosilylation of polysiloxanes having silane functions with a compound having at least one carbon double bond.

If necessary, it is possible to add to the polysiloxane coating, as well as to at least one layer of the preferably inventively used tubular foil independently from each other additives selected from the group comprising antiblocking agents, antistatic agents, antifogging agents, antimicrobial ingredients, dyes, color pigments, stabilizers, preferably heat stabilizers, process stabilizers, processing aids, flame retardants, nucleating agents, crystallization aids, preferably crystal-nucleating agents, lubricants, optical brighteners, flexibilizers, sealants, plasticizers, antiblocking agents, fillers, peeling additives, waxes, wetting agents, compounds with surface activity, preferably surfactants, and dispersing agents. However, the release effect of the polysiloxane coating must not be impaired thereby.

Optionally, the polysiloxane coating as well as optionally at least one layer of the plastics foil, can, if necessary, independently from each other comprise at least 0.01-30% by weight, preferably at least 0.1-20% by weight, based on the total weight of the respective layer, of at least one of the above-mentioned additives.

The single- or multilayer, tubular plastics foil used in the process of the invention can be produced, before the application of the curable polysiloxane coating, by known production methods, particularly preferably by blown-film extrusion or blown-film coextrusion, whereby the thickness of the tubular plastics film is already established by the, preferably only once blowing-up ratio of the extruded tubular film.

According to a preferred embodiment, the preferably tubular foil used in the inventive process is, before the application of the curable polysiloxane coating, produced and used in the form of a single- or multilayer tubular plastics foil. This tubular foil can preferably be embossed after production directly, without prior storage. Optionally, the foil can be opened at least at one side before or after embossing.

By embossing it is possible, in-line or off-line, to provide a preferably tubular inventively used plastics foil having only on one side or right through going an embossed structure, preferably by means of structuring or embossing calendars comprising a screen equipment for applying a screen pattern, preferably a roll system for applying a screen pattern. Preferably, this type of calendar has counterrotating rolls arranged at a certain distance vertically above one another. For the embossing process, the flat laid, preferably still tubular plastics foil is carried to the rolls and passed through the slit, the width of which being variably adjustable. The roll system for applying a screen pattern preferably has a first roll with a comparatively hard surface, particularly preferably a steel roll, and a second roll with a less hard surface, preferably made of a resilient material, particularly preferably of rubber or ebonite.

Before the application of, or between the two applications of, the curable polysiloxane coating, the flat laid foil used in an inventive process, preferably being tubular or optionally already opened at least on one side, can preferably be rolled up and optionally stored in rolled-up form. Preferably during the first roll-up process the preferably tubular foil is laid flat simultaneously. The rolled-up tubular foil is in turn unrolled for the first or the further application of the curable polysiloxane coating, i.e. for step (a) and, respectively, (c) of the inventive process.

Preferably, the total thickness of the full-width flat foil provided with a cured polysiloxane coating on one of the surfaces, or of the two foils each provided with a cured polysiloxane coating on one surface, these being respectively obtained after step (e) of the process, optionally after any still necessary longitudinal-side opening of the tubular plastics foil, is ≤45 μm, preferably ≤35 μm, particularly preferably ≤25 μm.

If according to the inventive process a single-layer, tubular film based on LDPE is used, the thickness of the final product, i.e. of the foil having a cured polysiloxane coating on one of its surfaces, can preferably be ≤45 μm.

If according to the inventive process a single-layer, tubular film based on HDPE is used, the thickness of the final product, i.e. of the foil having a cured polysiloxane coating on one of its surfaces, preferably can be ≤35 μm.

If according to the inventive process a tubular foil is used which foil has three layers and the internal layer of which is based on at least one homo- or copolyamide, and each of the two surface layers is based on at least one olefin homo- or copolymer, preferably on at least one olefin copolymer, particularly preferably on at least one propylene copolymer, the thickness of the final product, i.e. of the foil having a cured polysiloxane coating on one of its surfaces, can preferably be ≤25 μm.

The thickness of the polysiloxane coating of a foil obtained by the inventive process is preferably ≤5 μm, particularly preferably ≤3 μm, very particularly preferably in the range from 0.1 μm to ≤3 μm, in particular in the range from 0.2 μm to ≤1.5 μm.

A further object of the present invention is a foil having a cured polysiloxane coating on one of its surfaces and obtainable by an inventive process.

The foil having on one surface a cured polysiloxane coating and obtainable by an inventive process has an excellent suitability as peelable release foil or peelable protective foil.

The peelable release foil or peelable protective foil obtained by an inventive process can have been embossed.

The peelable release foil or peelable protective foil obtained by an inventive process can be a printed and/or colored and/or transparent foil.

A further object of the present invention is also the use of a foil obtainable according to the inventive process as peelable release foil or peelable protective foil, preferably as peelable release foil or peelable protective foil, preferably for self-adhesive labels, for adhesive tapes, for stickers or for adhesive hygiene products, preferably in sanitary towels and panty inserts.

The inventive process can preferably be carried out in an equipment arrangement described hereinafter:

The said equipment arrangement comprises at least
(1) a first metering device for the single-side coating of one of the available surfaces of a flat laid, single- or multi-layer plastics foil which is preferably still tubular or optionally has already been opened at least at one side, with at least one curable polysiloxane, optionally in combination with a first evacuation device, preferably in the form of a cutting or piercing apparatus,
(2) a first dryer unit for the curing of the polysiloxane coating applied by means of the metering device (1) on one of the surfaces of the flat laid tubular foil,
(3) optionally a turning device, preferably a crossbar system, for turning the flat laid, tubular foil already coated with a cured polysiloxane coating on one of its surfaces,
(4) a second metering device for applying on the uncoated second surface of the flat laid foil, preferably still tubular or optionally already opened at at least one side, at least one uncured polysiloxane, optionally in combination with a second evacuation device, preferably in the form of a cutting or piercing apparatus,
(5) a second dryer unit for the curing of the polysiloxane coating applied by means of the metering device (4) to this second surface of the flat laid foil.

The equipment arrangement used can also comprise a cutting apparatus (6), preferably in the form of blades, for the complete opening, preferably complete separation, at least along one lateral edge, preferably along both lateral edges in the movement direction, of the flat laid foil coated with a cured polysiloxane coating on both of its surfaces, and preferably still tubular or optionally opened only on one side. It is preferable that the equipment arrangement used provides—if necessary—one or two rollers by means of which the full-width flat foil obtained after complete opening along one lateral edge of the flat laid foil, or the two foils obtained after complete opening along both lateral edges, is/are rolled up, and can therefore be stored in rolled-up form.

The examples hereinafter serve to illustrate the invention, but are not to be interpreted as restrictive.

EXAMPLES

Example 1

A single-layer tubular plastics foil produced by blown-film extrusion, composed of LDPE with thickness of 35 μm is laid flat under evacuation and is coated with a liquid uncured polysiloxane on one of its surfaces. After thermal curing of said coating in a dryer unit, the single-side-coated, flat laid tubular foil is turned about 180°, and its second, still uncoated surface is likewise coated with a liquid uncured polysiloxane. Said second coating is also thermally cured in a dryer unit. The thickness of each of the polysiloxane coatings is 2 μm. The resultant flat laid, tubular foil coated on each surface with a cured polysiloxane is in each case completely separated in the movement direction along each lateral edge, thus providing two LDPE foils each single-side-coated with a cured polysiloxane. The total thickness of each of these foils is 37 μm.

Example 2

A single-layer tubular foil produced by blown-film extrusion, made with HDPE with a total thickness of 30 μm is laid flat with evacuation and coated with a liquid uncured polysiloxane on one of its surfaces. After thermal curing of said coating in a dryer unit, the single-side-coated, flat laid tubular foil is turned about 180°, and its second, still uncoated surface is likewise coated with a liquid uncured polysiloxane. Said second coating is also thermally cured in a dryer unit. The thickness of each of the polysiloxane coatings is 1.5 µm. The resultant flat laid, tubular foil coated on each of its surfaces with a cured polysiloxane is completely separated in the movement direction along one lateral edge, thus providing, after the HDPE foil has been laid flat at the full width, a foil coated on one of its surfaces with a cured polysiloxane and having a total thickness of 31.5 µm.

Example 3

A three-layer tubular foil produced by blown-film coextrusion, composed of an internal layer made of a copolyamide and having on each surface a layer (1) based on a propylene copolymer, has a total thickness of 21 µm. Said foil is laid flat under evacuation, and coated with a liquid uncured polysiloxane on one of its surfaces. After thermal curing of said coating in a dryer unit, the single-side-coated, flat laid tubular foil is turned about 180°, and its second, still uncoated surface is likewise coated with a liquid uncured polysiloxane. Said second coating is also thermally cured in a dryer unit. The thickness of each of the polysiloxane coatings is 1.5 µm. The resultant flat laid, tubular foil coated on each surface with a cured polysiloxane is completely separated in the movement direction along each lateral edge, thus giving two plastic foils each being single-side-coated with a cured polysiloxane. The total thickness of each of these foils is 22.5 µm.

Figure 2:
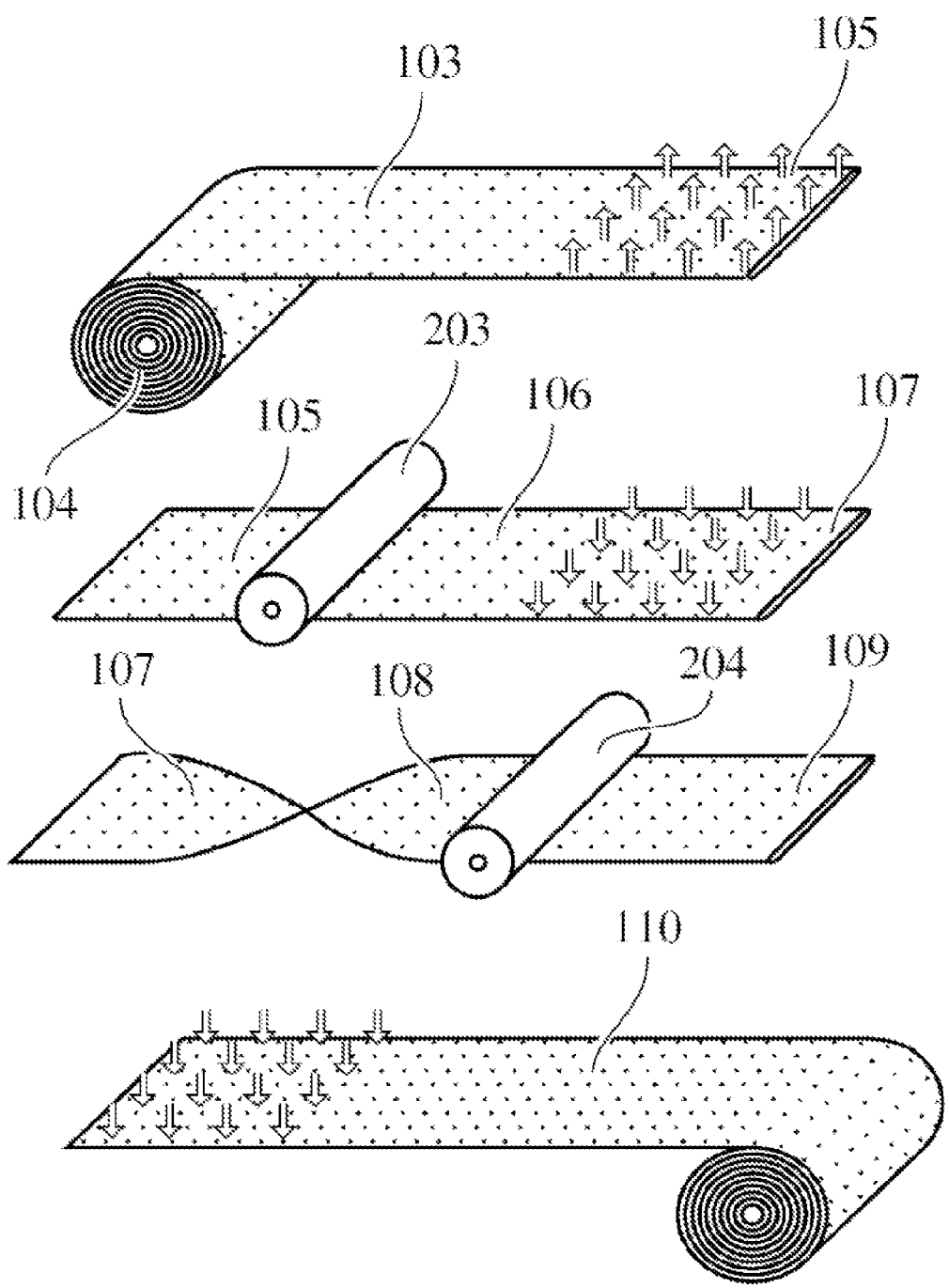
FIG. 2 is a diagram of a process for coating under evacuation each surface of a flat laid and embossed, tubular foil used in the inventive process.
Figure 3:
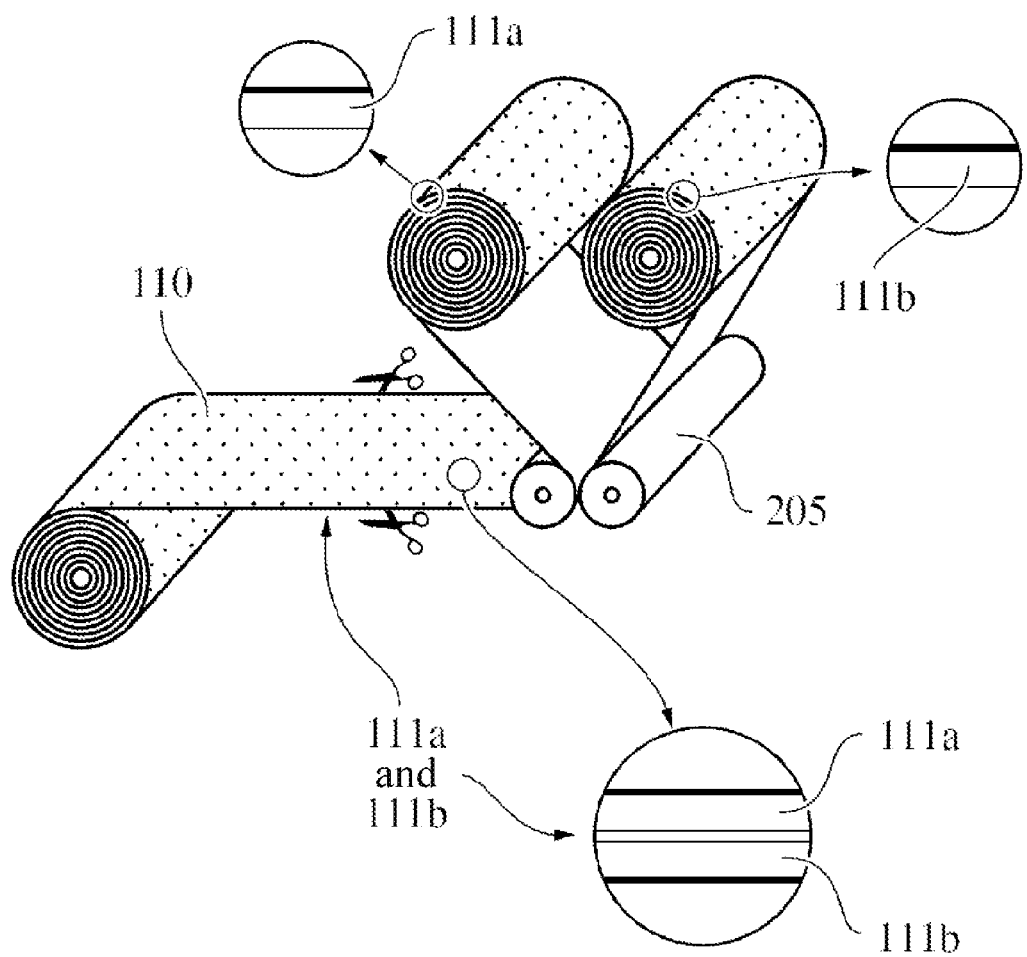
FIG. 3 is a diagram of the cutting for opening, in the movement direction, along the two lateral edges, of the flat laid, embossed, tubular foil (110) having on each surface a cured polysiloxane coating and initially still rolled up.

FIGS. 1 to 3 (FIG. 1 to FIG. 3) show a preferred example of an embodiment of the inventive process, which is explained in more detail hereinafter.

FIG. 1 is a diagram of the preferred production process for a flat laid, tubular foil used in an inventive process. This tubular foil (100) is produced with a certain diameter (101) by blown-film (co)extrusion, by extrusion through an annular die of the extruder (200) and by a certain blow-up ratio. The resulting tubular foil (100) is laid flat by passage between two rollers (201), in order to obtain a flat laid, tubular foil (102) that can be used in the process of the invention. The flat laid, tubular foil (102) is preferably passed through two rolls of a roll system (202) that produces a screen pattern, in order to provide a foil with an embossed structure. The embossed, flat laid, tubular foil (103) is rolled up by means of another roller (201), whereupon the resultant flat laid, embossed and rolled-up tubular foil (104) can optionally be stored in this rolled-up form.

FIG. 2 is a diagram of a process for coating under evacuation each surface of a flat laid and embossed, tubular foil used in the inventive process. The flat laid, embossed, rolled-up tubular foil (104) is first unrolled to give an embossed, flat laid, tubular foil (103), which is evacuated (as depicted by the arrows pointing upward in the diagram). One surface of the evacuated, flat laid, embossed, tubular foil (105) is coated with at least one curable polysiloxane, in liquid form, by means of a first metering device (203). The coating on the flat laid tubular foil (106) is cured by drying (as shown in the diagram by the arrows pointing downward), thus providing an embossed, flat laid, tubular foil (107) coated with a cured polysiloxane coating on one of its surfaces. This single-side-coated, flat laid, tubular foil can be rolled up and placed into intermediate storage before, after unrolling, it is likewise coated on its second, uncoated surface with at least one uncured polysiloxane, preferably in liquid form, by means of a second metering device (not shown). It is preferable that the tubular foil (107) is turned about 180°, for example by means of a crossbar system, whereupon the tubular foil (108) that has been turned about 180° can optionally again be evacuated.

The uncoated second surface of this flat laid, tubular foil (108) is likewise coated with at least one uncured polysiloxane, preferably in liquid form, by means of a second metering device (204), thus providing, after curing of the coating under drying (as shown in the diagram by the arrows pointing downward) an embossed, flat laid, tubular foil (109) coated on each side with a polysiloxane. The embossed, collapsed tubular foil (110) having on each surface a cured polysiloxane coating is wound up and optionally stored.

FIG. 3 is a diagram of the cutting for opening, in the movement direction, along the two lateral edges, of the flat laid, embossed, tubular foil (110) having on each surface a cured polysiloxane coating and initially still rolled up. For this, the embossed, flat laid, rolled-up, tubular foil (110) having on each surface a cured polysiloxane coating is first unwound, and is completely separated along the two lateral edges, in the movement direction, by means of a cutting apparatus (as shown by the two scissors in the diagram), thus giving two mutually superposed foils (111a and 111b) each having a polysiloxane coating on one of its surfaces. Each of the superposed foils (111a and 111b) is rolled up separately by means of two rollers (205), in order to provide a rolled-up foil (111a) having a polysiloxane coating (111b) on one of its surfaces, where each film can optionally be stored prior to final use.

What is claimed is:

1. A process for producing a single- or multilayer plastics film provided with a thermally cured polysiloxane coating on one of its surfaces, according to which a tubular, single- or multilayer plastic film is first flattened and then
    (a) is coated on one side with at least one polysiloxane that has not yet been cured,
    (b) this polysiloxane coating is cured by exposure to heat under drying,
    (c) the second side of the flattened tubular, plastics film is coated with at least one polysiloxane that has not yet been cured,
    (d) this polysiloxane coating is cured by exposure to heat under drying, and
    (e) at least along one lateral edge the flattened, tubular plastics film which has been provided with a cured polysiloxane coating on each side, is opened and the resulting one or two flat films with cured polysiloxane coatings on one surface is/are stored in the form of a roll.

2. The process of claim 1, wherein before carrying out step (c) the film is turned about 180°.

3. The process of claim 1 wherein the process is continuous.

4. The process of claim 1, wherein the tubular plastics film is based on a thermoplastic polymer.

5. The process of claim 4, wherein the tubular plastics film is based on at least one biodegradable thermoplastic polymer.

6. The process of claim 5, wherein the thermoplastic, biodegradable polymers used comprised at least one biodegradable polymer selected from the group consisting of lactic acid homo/copolymers, cellulose, cellulose derivatives, thermoplastic starch, polyesters, at least partially hydrolyzed polyvinyl acetates, ethylene-vinyl alcohol copolymers and mixtures of at least two of said polymers.

7. The process of claim 6, wherein the thermoplastic, biodegradable polymer used comprised at least one polylactide.

8. The process of claim 4, wherein the tubular plastics film is based on at least one thermoplastic polymer selected from the group consisting of olefin homo- or copolymers, homo- or copolyamides, and biodegradable natural, semisynthetic, or synthetic polymers.

9. The process of claim 8, wherein the thermoplastic olefin homo- or copolymers used comprised at least one thermoplastic olefin homo- or copolymer of α,β-unsaturated olefins having from 2 to 10 carbon atoms.

10. The process of claim 8, wherein the thermoplastic homo- or copolyamides used comprise at least one homo- or copolyamide selected from the group consisting of thermoplastic, aliphatic, semiaromatic, or aromatic homo-and copolyamides.

11. The process of claim 1, wherein the tubular plastics film has one layer.

12. The process of claim 11, wherein the tubular plastics film is composed of LDPE or HDPE.

13. The process of claim 1, wherein the tubular plastics film has a multilayer structure.

14. The process of claim 13, wherein the multilayer structure has an internal copolyamide layer with a layer made of a propylene copolymer on each of its surfaces.

15. The process of claim 1, wherein the thickness of each cured polysiloxane coating is ≤2 μm.

16. The process of claim 1, wherein the flat laid, tubular plastics film is embossed before polysiloxane coating.

17. The process of claim 1, wherein before carrying out step (c) the film is rolled up and, after intermediate storage, is unrolled for carrying out step (c).

* * * * *